April 29, 1958
E. SWIDZINSKI
2,832,543
DEVICE FOR GUIDING THE BLIND
Filed March 31, 1955
2 Sheets-Sheet 1
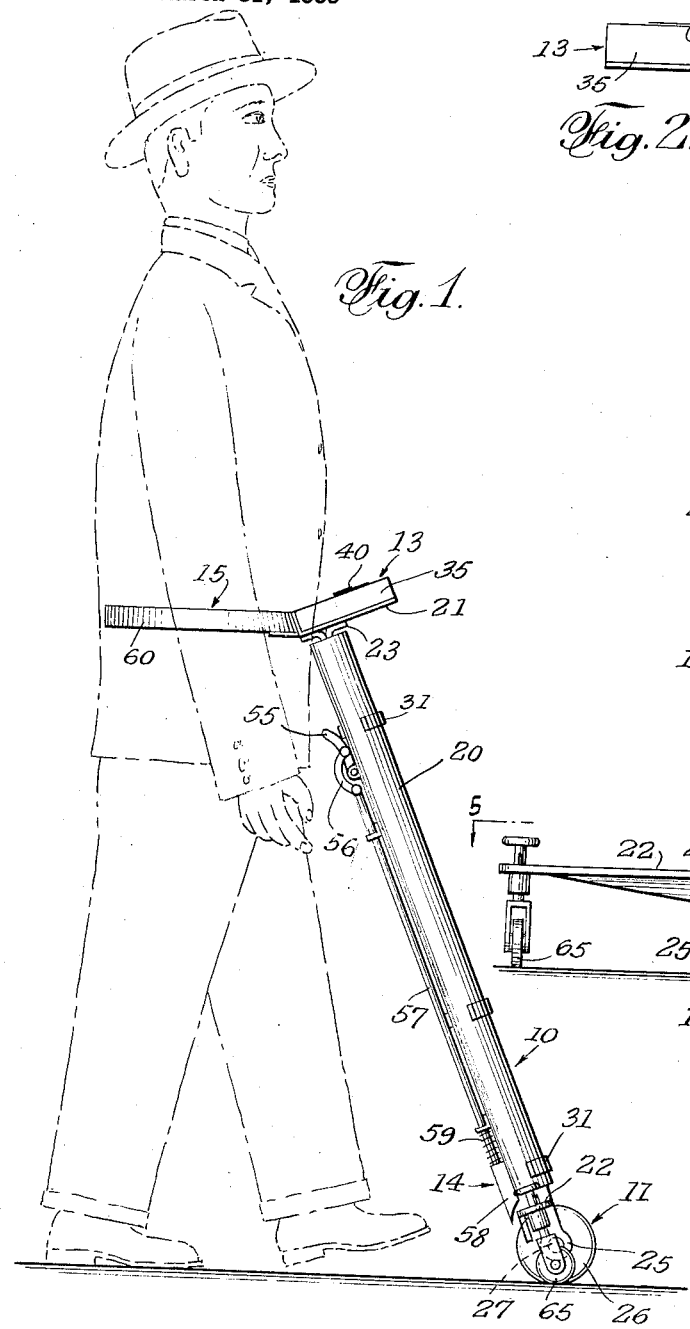
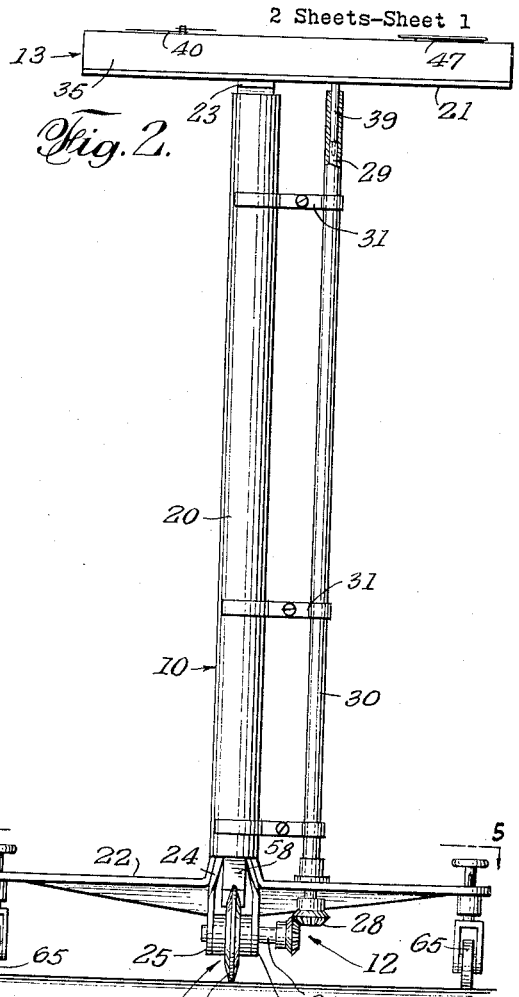
INVENTOR.
EUGENE SWIDZINSKI
BY C. G. Stratton
ATTORNEY April 29, 1958 E. SWIDZINSKI 2,832,543
DEVICE FOR GUIDING THE BLIND
Filed March 31, 1955 2 Sheets-Sheet 2
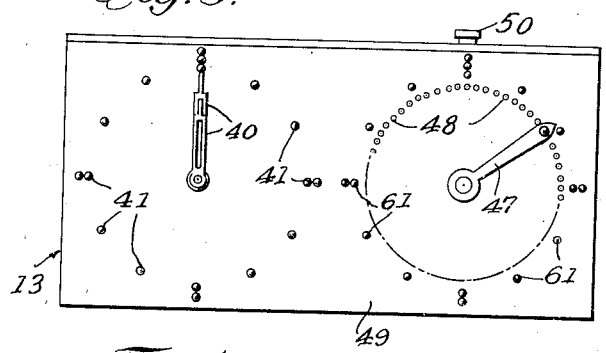
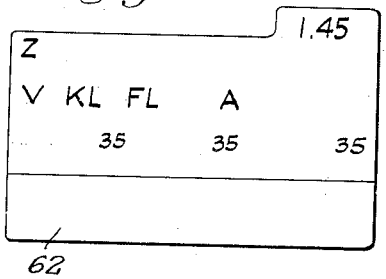
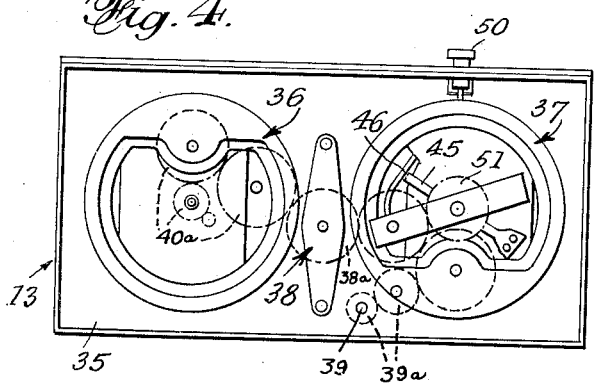
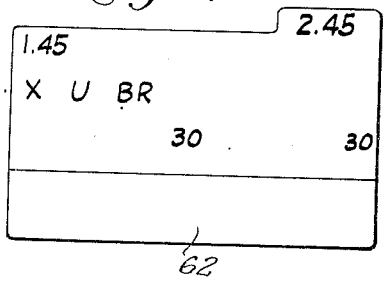
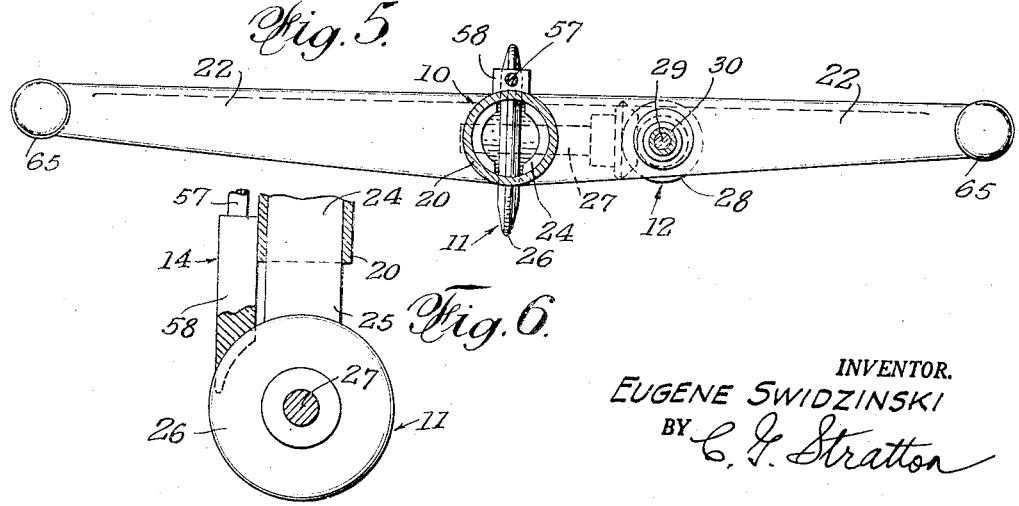
INVENTOR.
EUGENE SWIDZINSKI
BY C. G. Stratton
ATTORNEY

United States Patent Office 2,832,543
Patented Apr. 29, 1958

2,832,543

DEVICE FOR GUIDING THE BLIND

Eugene Swidzinski, Los Angeles, Calif.

Application March 31, 1955, Serial No. 498,178

7 Claims. (Cl. 235—128)

This invention relates to a device for guiding the blind and has for an object to provide means adapted to be pre-set to sound a signal at the time that a blind person reaches a designated place with respect to a starting place. In this manner, the itinerary of a blind person from place to place may be planned in advance and said person apprised of arrival at such places.

Another object of the invention is to provide a system utilizing a device of the character referred to, together with time map or chart means, to guide a blind person during movements from place to place.

A more specific object of the invention is to provide a distance-recording device that embodies alarm means that sounds when the device records the distance to which the same has been pre-set.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 1 is a side elevational view of a device for guiding the blind, the same being shown in operative position.

Fig. 2 is an enlarged front elevational view thereof.

Fig. 3 is a further enlarged plan view of measuring means provided at the upper end of the device.

Fig. 4 is a similar view of said measuring means with the cover or dial plate thereof removed.

Fig. 5 is a cross-sectional view as taken on line 5—5 of Fig. 2 and drawn to the scale of Figs. 3 and 4.

Fig. 6 is a further enlarged fragmentary detail sectional view of brake means used in the device.

Figs. 7 and 8 are face views of exemplary cards or charts used in the present system.

The blind-guiding device that is illustrated comprises, generally, a frame 10, means 11, carried by said frame, to track along the ground, means 12 to transmit such tracking movement, measuring means 13 driven by the means 12, means 14 to brake the tracking means 11, and means 15 to removably secure the device in operative position on the person of the user.

The frame 10 is shown as an elongated tube or pipe 20 that carries an upper plate 21 and, at its lower end, is provided with a transverse bar 22 extending symmetrically from either side of said tube 20. The plate 21 is connected to the tube as by brackets 23 and the bar 22 is connected to the tube as by brackets 24. The latter are extended to provide spaced bearing ears 25, the same extending below bar 22, as best seen in Figs. 1 and 2.

The tracking means 11 is shown as a roller or wheel 26 mounted between and rotational in bearing ears 25, a shaft 27 being driven by said wheel as the same tracks along the ground in the manner shown.

The means 12 for transmitting tracking rotation of wheel 26 comprises suitable gearing 28 driven by shaft 27 and a shaft 29, extending alongside of and parallel to tube 20, and driven by said gearing. Shaft 29 may be housed in a tube 30 and the latter held in fixed relation to tube 20, substantially as shown, by clamps 31.

The measuring means 13 that is illustrated comprises a housing 35 that is mounted on plate 21 and essentially includes measuring mechanism 36 and alarm mechanism 37 in side-by-side relation within housing 35, a driving connection 38 between the mechanisms 36 and 37, and a driving connection 39 between the shaft 29 of transmitting means 12 and the mechanism 37.

The present measuring means 13 is arranged to measure increments or units that are a function of the circumference of wheel 26. For example, a unit, as measured by the mechanism 36, may be set at three revolutions of wheel 26. If such three revolutions of the tracking wheel equal one yard, then such distance may be shown by a particular increment of movement of said mechanism 36. The accumulation of such movement may be read by the driven positions of arms or pointers 40. The positions of said pointers may be determined by a blind person by the sense of touch with respect to dimples or like indicators 41.

Since wheel 26 drives the means 12 and the latter, through the connection between shaft 29 and connector 39, drives the measuring means, the pointers 40 move according to the number of revolutions of said wheel, and are moved only when the wheel is being tracked. Otherwise, the pointers remain stationary. In the present arrangement, rotation of connector 39 imparts drive to mechanism 36 through mechanism 37 and driving connection 38.

As shown in Fig. 4, the connector 39 drives said mechanisms 37 and 38 through gear means 39a, 38a, and 40a. While the gear means is shown to be a gear train, it is understood that any motion transmitting mechanism could be used in the combination to effect the desired result. In the present arrangement, as the revolutions of connection 39 are transmitted to gear wheels 40a, the pointers 40 are moved to measure the distance travelled, as mentioned above.

The alarm mechanism 37 includes the usual detent 45 that is operatively associated with the bell clapper 46 to stop or release the latter according to the set position of the alarm, as determined by alarm pointer 47. The latter comprises a flexible member that can be moved to a desired radial position and held by one of the holes 48 in the dial plate 49. This is the direct equivalent of setting the alarm of an ordinary alarm clock except that the alarm mechanism is physically separated from the measuring mechanism. A typical alarm release button 50 is provided.

It will be clear that when the measuring mechanism arrives at a position coincident to that of the pre-set position of pointer 47, wheel 51 will release detent 45 and the latter will release clapper 46 which may vibrate to sound the alarm.

There may be times when tracking of wheel 26 is not desired. At such time, the user may utilize means 14 and release a trigger 55 which, through a link 56, releases rod 57. The latter is spring urged in a direction to move a brake shoe 58 into braking engagement with wheel 26, as shown in Fig. 6. The spring that sets the brake is shown at 59. Said trigger, as shown, is located where the same may be easily reached by the user.

It is contemplated that the means 15 comprises a belt 60 adapted to encircle the user's waist and to be connected, for instance, to plate 21 in a manner to dispose the device in a forwardly angled position with the wheel 26 in such forward position as to be clear of the user's feet during normal walking. This position brings the measuring means in position forward of the waist so that the pointers 40 and 47, as well as dimples 41 and similar dimples 61 of the alarm dial, may be finger-sensed by the user and/or adjusted, as desired.

While the above-described device may be used by itself to appraise a blind person of the distance travelled, the same is more advantageously used in combination with a set of charts or cards as exemplified in Figs. 7 and 8.

Such cards may be produced by actual survey of a route or routes by tracing the same with the present device and recording distances with respect to units or revolutions of wheel 26 and also particular features of the route, as regards condition and details and characteristics. Thus, based on a preconceived code, the letter A may be used to designate an alley or narrow street; the letters BR a building or store; FL a fence; KL the direction "keep left"; U regular sidewalk; V very narrow sidewalk; X street or avenue, etc.

The above are exemplary code terms that are indicated in regular English letters on the cards that are illustrated and will also be provided thereon in Braille so as to be read by a blind person. In addition, each card shows the range of units, as from Z (zero) to 1.45 (Fig. 7), and from 1.45 to 2.45 (Fig. 8). Also, this range may be broken into smaller unit increments, as shown, and additional information or explanations provided in spaces 62.

Before a blind person sets out on a path of movement from place to place, the group of cards that he will use to chart and guide his course will be provided. Assuming the first card to be one such as shown in Fig. 7, the alarm hand or pointer 47 will be set to the "35" unit position and the alarm button 50 pulled to set the alarm. The hands 40 will be at the 12 o'clock or zero position shown.

With the present device in operative position, the blind person sets out on the journey, knowing that the sidewalk is very narrow (V) and that he must keep to the left (KL) against a fence (FL). When the hands 40 have moved to a position coinciding with that set for the alarm, the alarm will ring and the blind person will come to a stop and re-set the hand to the "70" unit position, the same being thirty-five units additional to the original thirty-five units. The hands 40 will continue to move as the journey is continued and when the user reaches an alley (A) the alarm will again ring. This is repeated until the data on said card is used up as well as the user having traversed one hundred forty-five units. Now, the next card (Fig. 8) is used and the process continued. Thus, an itinerary may be charted and a blind person guided therealong by the present means.

It will be noted that the bar 22 carries rollers or casters 65 on its opposite ends (Figs. 2 and 5). These may serve as feelers that drop when losing contact with the pavement, as off a curb or a step, and apprise the user of the attending danger.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A device for guiding the blind comprising, in combination, an elongated frame, means for fastening said frame to the waist of a user to present the same at a forward and downward angle in front of the user, a tracking wheel on the lower end of said frame and rotational along the ground during progress of the user therealong, measuring means carried by the upper end of the frame, means for interpreting said measuring means by the sense of touch of the user, said interpreting means being connected with said measuring means at the upper end of the elongated frame, means interconnecting the wheel and the measuring means to operate the latter in accordance with the number of revolutions of the former, an alarm operatively connected to said measuring means, said alarm being adapted to sound after a predetermined number of revolutions of said wheel.

2. A device for guiding the blind comprising, in combination, an elongated frame, a cross bar at the lower end of the frame, feeler wheels mounted on the ends of the cross bar, a tracking wheel on the lower end of said frame and rotational along the ground during progress of the user therealong, measuring means carried by the upper end of the frame, means for interpreting said measuring means by the sense of touch of the user, said interpreting means being connected with said measuring means at the upper end of the elongated frame, and means interconnecting the wheel and the measuring means to operate the latter in accordance with the number of revolutions of the former.

3. A device of the character described, comprising an elongated frame, means for fastening said frame to the waist of a user to present the same at a forward and downward angle in front of the user, a tracking wheel on the lower end of said frame and rotational along the ground during progress of the user therealong, releasable brake means carried by the frame to arrest rotation of the tracking wheel, measuring means carried by the upper end of the frame, means for interpreting said measuring means by the sense of touch of the user, said interpreting means being connected with said measuring means at the upper end of the elongated frame, and means interconnecting the wheel and the measuring means to operate the latter in accordance with the number of revolutions of the former.

4. A device for guiding the blind comprising an elongated frame, a cross bar at the lower end of the frame, feeler wheels mounted on the ends of the cross bar, a tracking wheel on the lower end of said frame and rotatable along the ground, measuring means carried by the upper end of the frame, means for interpreting said measuring means by the sense of touch of the user, said interpreting means being connected with said measuring means at the upper end of the elongated frame, means for interconnecting the wheel and the measuring means to operate the latter in accordance with the number of revolutions of the former, and an alarm operatively connected to said measuring means, said alarm being adapted to sound after a predetermined number of revolutions of said wheel.

5. A device for guiding the blind comprising an elongated frame, means for fastening said frame to the waist of a user to present the same at a forward and downward angle in front of the user, a tracking wheel on the lower end of said frame and rotatable along the ground during progress of the user therealong, releasable brake means carried by the frame to arrest rotation of the tracking wheel, measuring means carried by the upper end of the frame, means for interpreting said measuring means by the sense of touch of the user, said interpreting means being connected with said measuring means at the upper end of the elongated frame, means interconnecting the wheel and the measuring means to operate the latter in accordance with the number of revolutions of the former, and an alarm operatively connected to said measuring means, said alarm being adapted to sound after a predetermined number of revolutions of said wheel.

6. A device for guiding the blind comprising an elongated frame, means for fastening said frame to the waist of a user to present the same at a forward and downward angle in front of the user, a cross bar at the lower end of the frame, feeler wheels mounted on the ends of the cross bar, a tracking wheel on the lower end of said frame and rotatable along the ground during progress of the user therealong, releasable brake means supported by the frame to arrest rotation of the tracking wheel, means for measuring distance carried by the upper end of the frame, means for interpreting said measuring means by the sense of touch of the user, said interpreting means being connected with said measuring means at the upper end of the elongated frame, means interconnecting the tracking wheel and the measuring means to operate the latter in accordance with the number of revolutions of the former, and an alarm operatively connected to said measuring means, said alarm being adapted to sound after a predetermined number of revolutions of said wheel.

7. A device for guiding the blind comprising, in combination, an elongated frame, means for fastening said frame to the waist of a user to present the same at a forward and downward angle in front of the user, a tracking member positioned at the lower end of said frame and driven by encounter with the ground during movement by a user therealong, means for measuring distance carried by the upper end of the frame, means interconnecting the tracking member and the measuring means to operate the latter in accordance with the number of revolutions of the former, means for touch interpreting said measuring means, and an alarm operatively connected to said measuring means adapted to sound after a predetermined number of revolutions of said tracking member whereby an accurate recordation of the distance travelled may be determined both audibly and by the sense of touch.

References Cited in the file of this patent

UNITED STATES PATENTS

| | | |
|---|---|---|
| 238,563 | Brown | Mar. 8, 1881 |
| 467,847 | Armenta | Jan. 26, 1892 |
| 530,686 | Gray | Dec. 11, 1894 |
| 673,300 | Stradel et al. | Apr. 30, 1901 |
| 718,396 | Smith | Jan. 13, 1903 |
| 740,522 | Bundy | Oct. 6, 1903 |
| 780,753 | Holowell | Jan. 24, 1905 |
| 1,177,582 | Murphy | Mar. 28, 1916 |
| 1,835,804 | Morra | Dec. 8, 1931 |
| 2,259,786 | Sutton | Oct. 21, 1941 |
| 2,477,432 | Walsh | July 26, 1949 |
| 2,559,981 | McBride | July 10, 1951 |
| 2,595,021 | Swanson | Apr. 29, 1952 |